United States Patent
Mokuya et al.

(10) Patent No.: US 7,024,421 B2
(45) Date of Patent: Apr. 4, 2006

(54) METHOD FOR LINKING MANAGEMENT-INFORMATION DATABASE STRUCTURE DEFINITION FILES, NETWORK DEVICE MANAGEMENT SYSTEM, AND PROCESS PROGRAM FOR LINKING MANAGEMENT-INFORMATION DATABASE STRUCTURE DEFINITION FILES

(75) Inventors: Senichi Mokuya, Suwa (JP); Shinji Ehara, Beppu (JP); Hozumi Mori, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 10/195,498

(22) Filed: Jul. 16, 2002

(65) Prior Publication Data

US 2003/0033282 A1    Feb. 13, 2003

(30) Foreign Application Priority Data

Jul. 19, 2001  (JP) .............................. 2001-220586

(51) Int. Cl.
*G06F 7/00* (2006.01)

(52) U.S. Cl. ............................ 707/102; 707/2; 707/10; 707/103 R; 707/103 Z; 709/315; 709/316

(58) Field of Classification Search ................... 707/2, 707/10, 100, 102, 103 R, 103 Z; 719/315, 719/316
See application file for complete search history.

(56) References Cited

U.S. PATENT DOCUMENTS 6,760,733 B1 * 7/2004 Komine et al. ............. 707/102

* cited by examiner

*Primary Examiner*—Shahid Alam
*Assistant Examiner*—Hung Pham
(74) *Attorney, Agent, or Firm*—Oliff & Berridge, PLC (57) ABSTRACT

If the definition of one MIB tree structure is dispersed across a plurality of MIB files, a desired object ID cannot be acquired without sequentially searching a several MIB files when the object ID is searched for. A management device includes a file linking unit linking a plurality of management-information database structure definition files (MIB files). The file linking unit reads header portions of a plurality of MIB files, learns the connection relationship of the plurality of MIB files from the read content, determines the order of linking from the learned connection relationship, and links the plurality of MIB files while reorganizing the content of each of the MIB files, thereby obtaining a single file MIB (linked MIB file).

3 Claims, 5 Drawing Sheets

METHOD FOR LINKING MANAGEMENT-INFORMATION DATABASE STRUCTURE DEFINITION FILES, NETWORK DEVICE MANAGEMENT SYSTEM, AND PROCESS PROGRAM FOR LINKING MANAGEMENT-INFORMATION DATABASE STRUCTURE DEFINITION FILES

BACKGROUND OF THE INVENTION

1. Field of Invention

The present invention relates to a method for linking management-information database structure definition files, a network device management system, and a process program for linking management-information database structure definition files.

2. Description of Related Art

The related art includes systems which totally manage a number of devices (hereinafter "network devices," and include personal computers, and printers, for example) that are connected to a network.

If the network device to be managed is a personal computer (hereinafter "PC"), data to be managed may include a diversity of data relating to the PC, such as data the PC acquired from the network. If the network device to be managed is a printer, the data to be managed is data relating to the printer, such as the amount of ink remaining in the printer. Each network device includes a management-information database that stores data to be managed.

The side managing the network device (hereinafter "management device") accesses the management-information database ("MIB database") on the network device side using network device management software or a MIB (Management Information Base) browser which is one of tools of the software. The management device thus monitors data (MIB data) to be managed and sets data.

A user who manages the network device using the network device management system acquires a management-information database structure definition file (MIB file) described in a standard format called "ANS1" from each device manufacturer to know the structure of the management-information database (MIB database), and converts the file into a format unique to the network device management system to use the file.

Figure 5:
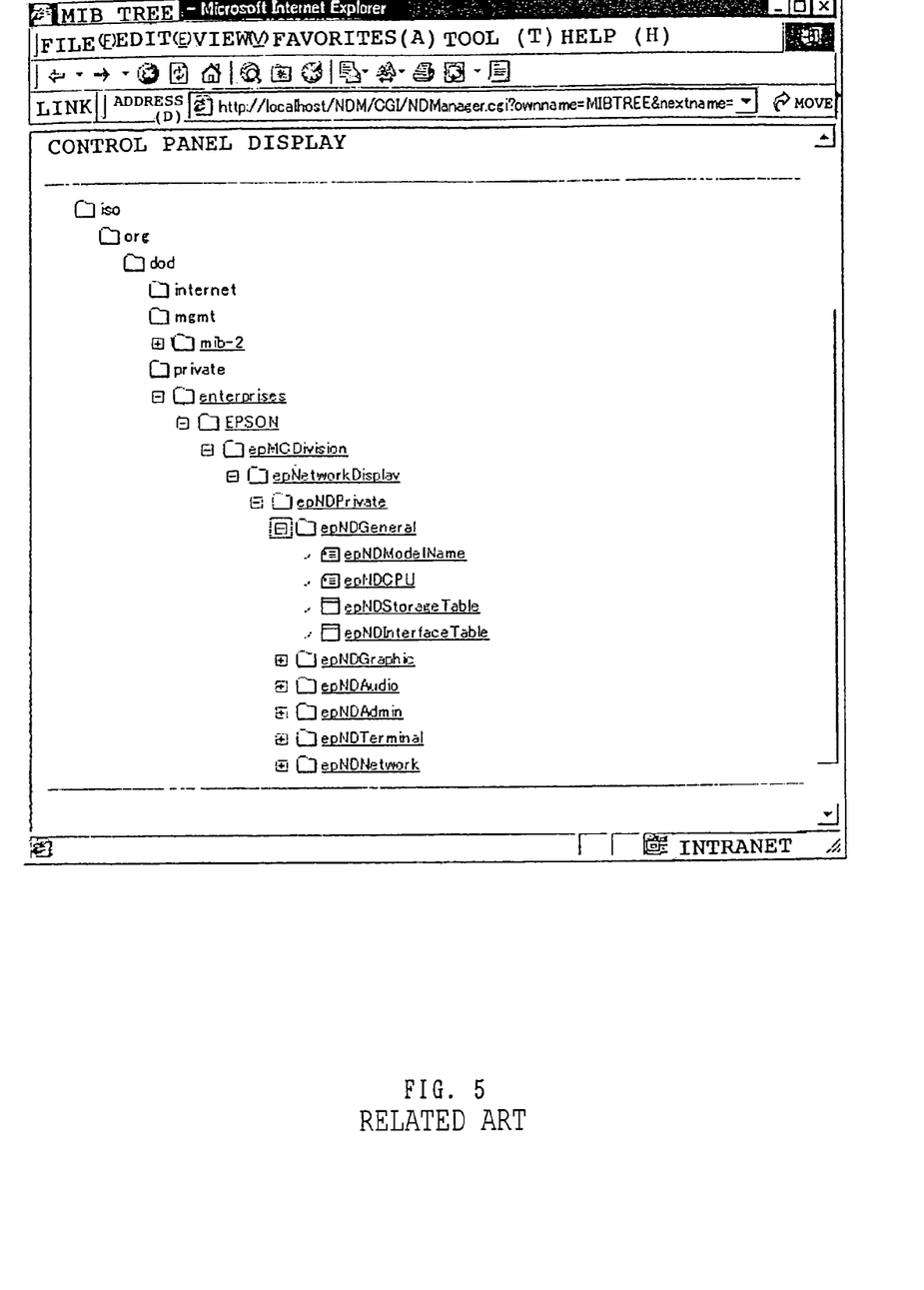
FIG. 5 is a schematic that illustrates a tree structure (an MIB tree) of a given management-information database (MIB database).

The MIB database has a tree structure, as shown in FIG. 5. The end of the tree stores data that is unique to the network device, and the location is designated using an address called an "object ID". The above-mentioned MIB file expresses the structure of the MIB database.

The MIB tree has typically several files in each portion of the MIB tree structure. In other words, a single MIB tree is defined by several MIB files.

If the definition of the structure of any one MIB tree is dispersed across a plurality of MIB files, several MIB files need to be sequentially tracked when an object ID (a data address) is searched for. When an import section containing a target object is found, an MIB file that is hierarchically higher than that import section needs to be searched. This step must be repeated before reaching a desired object ID.

When the object defined in one MIB file is used in another MIB file, the import section indicates which MIB file defines the object and states that the object is to be used.

The import section describes which section, in which MIB file is, relates to the object. Referencing the import section clarifies which MIB file the MIB file of interest is continued from. The format of the import section is standardized in the ASN1.

To acquire a desired section from a given network device, data present in an address designated by the object ID is acquired by designating the object ID. To set data, an address in which the data is to be set, the value of the data, the type of the data (information indicating whether the data to be set is a numerical value or a character string), etc., are needed.

When desired data is acquired from a given network device, the address of the source of the data is needed. When data setting on a network device is performed, the address of the destination for data setting and the type of the data are needed. These addresses and the data type are acquired from the MIB files.

For example, when the data setting is performed on one network device, the data type of the destination address of the data setting must be known. To this end, that address is searched for from the MIB file, and the data type of the address is acquired. Occasionally, several MIB files must be searched to find the address and the data type of the address. This process involves a number of process steps, and the utilization efficiency of the MIB file is extremely low.

SUMMARY OF THE INVENTION

The present invention permits an efficient management of a network device through the use of a single MIB file into which a plurality of MIB files are reorganized and linked when the definition of any given tree structure is dispersed across the plurality of MIB files.

To address or achieve the above, the present invention relates to a method for linking management-information database structure definition files in a network device management system. The network device management system includes a network device having a management-information database and a management device having network-device management device to manage the network device. The management device holds a plurality of management-information database structure definition files describing the structure of the management-information database, and the network-device management device manages the management-information database of the network device using the management-information database structure definition files. The management device performs a process to form a single management-information database structure definition file. The process includes reading a header portion of each of the plurality of management-information database structure definition files, learning the connection relationship of the plurality of management-information database structure definition files from the read content, determining the order of linking from the learned connection relationship, and linking the plurality of management-information database structure definition files into the single management-information database structure definition file in the order of linking while reorganizing the content of the management-information database structure definition files.

In a management method for managing the management-information database structure definition file, in the determining the order of linking the plurality of management-information database structure definition files, an import section of the read header portion is examined, the connection between the management-information database structure definition files is determined from the content of the import section, and the order of linking is determined from the connection.

In the method for linking management-information database structure definition files, the linking the plurality of management-information database structure definition files while reorganizing the content of the management-information database structure definition files, performs, on all management-information database structure definition files in the order of linking, reading the content of the management-information database structure definition file on a per unit of processing basis in accordance with the determined order of linking, deleting a section of the read content if the read content is a description of the import section, determining whether the read content is a duplicate of a description in another management-information database structure file if the read content is not the description of the import section, deleting a read character string if the read content is the duplicate, and writing the read content onto the linked management-information database structure definition file if the read content is neither the description of the import section nor the duplicate of the description in the other management-information database structure definition file.

A network device management system of the present invention includes a network device having a management-information database and a management device having a network-device management device to manage the network device. The management device holds a plurality of management-information database structure definition files describing the structure of the management-information database, and the network-device management device manages the management-information database of the network device using the management-information database structure definition files. The management device includes a file linking device having the function of linking the plurality of management-information database structure definition files. The file linking device performs a process to form a single management-information database structure definition file. The process includes reading a header portion of each of the plurality of management-information database structure definition files, learning the connection relationship of the plurality of management-information database structure definition files from the read content, determining the order of linking from the learned connection relationship, and linking the plurality of management-information database structure definition files into the single management-information database structure definition file in the order of linking while reorganizing the content of the management-information database structure definition files.

In the network device management system, in the determining the order of linking the plurality of management-information database structure definition files, a content of the import section of the read header portion is examined, the connection between the management-information database structure definition files is determined from the content of the import section, and the order of linking is determined from the connection.

In the network device management system, the linking the plurality of management-information database structure definition files while reorganizing the content of the management-information database structure definition files, performs, on all management-information database structure definition files in the order of linking, reading the content of the management-information database structure definition file on a per unit of processing basis in accordance with the determined order of linking, deleting a section of the read content if the read content is a description of the import section, determining whether the read content is a duplicate of a description in another management-information database structure file if the read content is not the description of the import section, deleting a read character string if the read content is the duplicate, and writing the read content onto the linked management-information database structure definition file if the read content is neither the description of the import section nor the duplicate of the description in the other management-information database structure definition file.

The preset invention relates to a process program of the present invention for linking management-information database structure definition files in a network device management system. The program linking management-information database structure definition files in the network device management system which has a network device having a management-information database and a management device having network-device management device to manage the network device The management device holds a plurality of management-information database structure definition files describing the structure of the management-information database, and the network-device management device manages the management-information database of the network device using the management-information database structure definition files. The process program performs a process to form a single management-information database structure definition file. The process program includes a program for reading a header portion of each of the plurality of management-information database structure definition files, and a program for learning the connection relationship of the plurality of management-information database structure definition files from the read content, a program for determining the order of linking from the learned connection relationship, and a program for linking the plurality of management-information database structure definition files into the single management-information database structure definition file in the order of linking while reorganizing the content of the management-information database structure definition files.

In the process program for linking management-information database structure definition files, the program for determining the order of linking includes a program for examining a content of the import section of the read header portion, a program for determining the connection between the management-information database structure definition files from the content of the import section, and a program for determining the order of linking is determined from the connection.

In the process program of the present invention for linking management-information database structure definition files, the program for linking the plurality of management-information database structure definition files while reorganizing the content of the management-information database structure definition files, including, on all management-information database structure definition files in the order of linking, a program for reading the content of the management-information database structure definition file on a per unit of processing basis in accordance with the determined order of linking, a program for deleting a section of the read content if the read content is a description of the import section, a program for determining whether the read content is a duplicate of a description in another management-information database structure file if the read content is not the description of the import section, a program for deleting a read character string if the read content is the duplicate, and a program for writing the read content onto the linked management-information database structure definition file if the read content is neither the description of the import section nor the duplicate of the description in the other management-information database structure definition file.

In accordance with the present invention, the connection relationship of the MIB files is learned from the content of the header portion of the plurality of management-information database structure definition files (MIB files), the order of linking is determined from the learned connection relationship, and the plurality of management-information database structure definition files are linked in accordance with the order of linking while reorganizing the content of the MIB files. Thus, the plurality of MIB files is integrated into the single MIB file.

When a target object is searched, the user reaches the target object by simply tracking the content of files from a single MIB file, and thereby an efficient file process is performed.

The connection relationship of the plurality of MIB files is determined based on the content described in the import section when the import section in the read header portion is examined.

Specifically, the import section present in the header portion of the MIB file contains information representing the connection of the MIB files. Referencing the import section clarifies what MIB file the MIB file of interest is continued from. The connection of the plurality of management-information database structure definition files is known by reading the content of the MIB files file by file, and examining the content of the import section thereof. In this way, the order of linking is determined.

When the order of linking of the plurality of MIB files is determined, the plurality of MIB files are integrated into a single MIB file in the order of linking.

When the plurality of MIB files is integrated into the single MIB file, the description of the import section representing the connection of the MIB files is not required any longer. The description of the import section is removed, and if each MIB file includes a duplicate, the duplicate portions may be reorganized into one portion.

The resulting single linked MIB file has a simple content that is free from unwanted sections and duplicate sections. As already discussed, when a target object is searched, the user reaches the target object by simply tracking the content of files from a single MIB file, and thereby an efficient file process is performed. The use of such an MIB file allows the network device management to be efficiently performed.

The file linking function of the present invention not only enhances the efficiency of the acquisition process of the above object, but also allows the user to efficiently respond when the specifications of a network device are changed.

When the specifications of a network device are changed, the device manufacturer thereof must produce a new MIB file that is responsive to the change, and must distribute the new MIB file to each user. In contrast, in accordance with the present invention, an MIB file describing a corrected portion or an added portion is simply distributed to each user. Using the file linking function of the present invention, the user links a new MIB file to an MIB file prior to the modification, thereby producing an MIB file reflecting the content of the modification. The user thus easily responds to the modification of the MIB file.

DETAILED DESCRIPTION OF PREFERRED EMBODIMENTS

The embodiments of the present invention are now discussed. The content of the discussion of the embodiments is related to a method for linking management-information database structure definition files, a network device management system, and a specific process content of a process program for linking the management-information database structure definition files in a network device management system.

Figure 1:
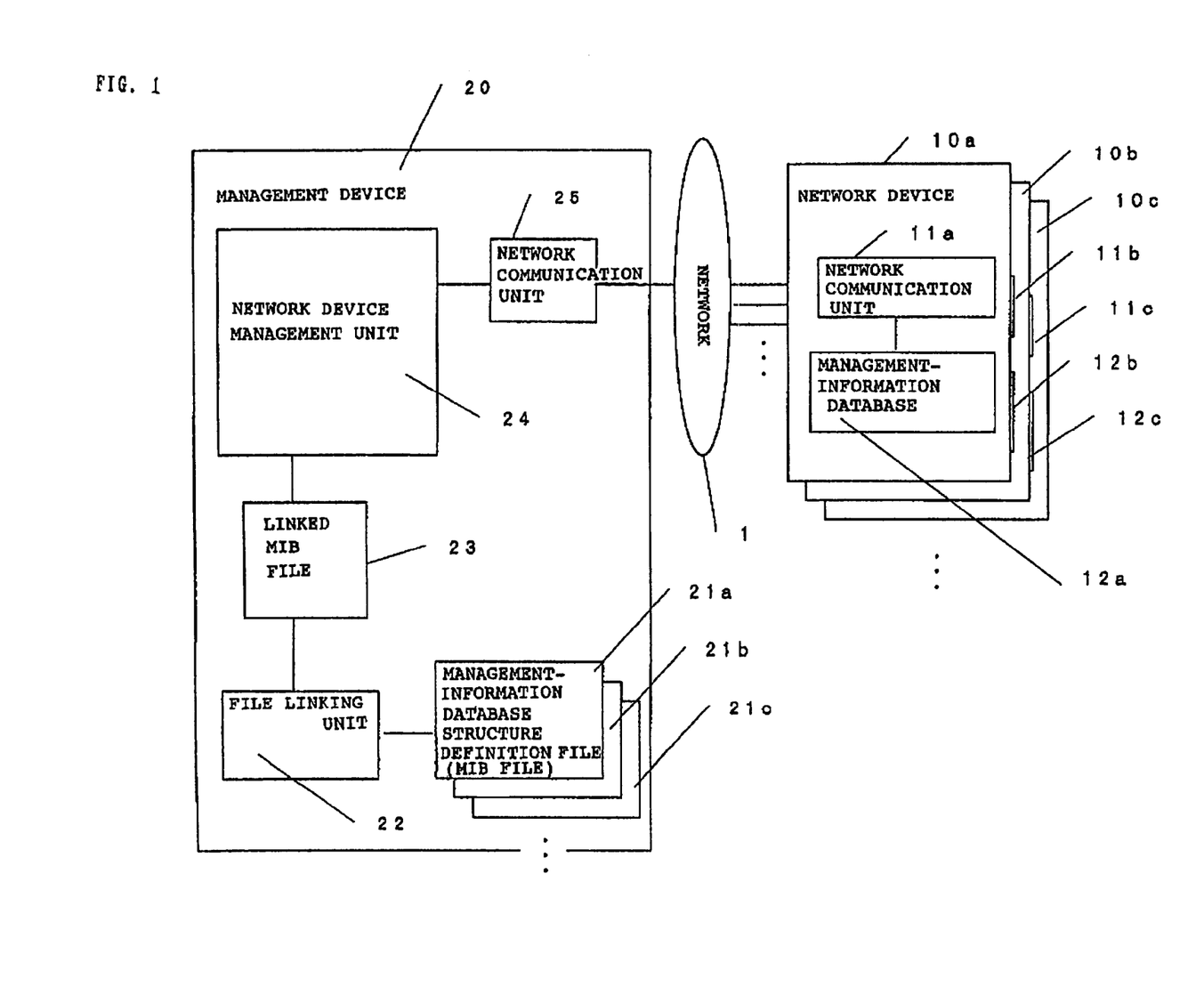
FIG. 1 is a schematic illustrating an embodiment of the network device management system of the present invention.

FIG. 1 illustrates the network device management system of the present invention. The network device management system includes, as significant portions thereof, a number of network devices 10a, 10b, 10c, . . . connected to a network 1 and a management device (a PC can be used as the management device) 20 to generally manage the network devices 10a, 10b, 10c, . . . .

Each of the network devices 10a, 10b, 10c, . . . includes a device function unit (not shown) performing the originally assigned function as a network device (for example, the function as a PC if the network device is a PC, and the function as a printer if the network device is a printer). Furthermore, the network devices 10a, 10b, 10c, . . . respectively include network communication units 11a, 11b, 11c, . . . and management-information databases (hereinafter "MIB databases") 12a, 12b, 12c, . . . as components related to the present invention.

The network communication units 11a, 11b, 11c, . . . physically respectively connect the network devices 10a, 10b, 10c, . . . to a network 1, thereby allowing each network device to communicate with another network device or a management device 20.

As already discussed, the network devices 10a, 10b, 10c, . . . respectively store a diversity of data (hereinafter "MIB data") of their own in the management-information databases 12a, 12b, 12c, . . . and the data structure thereof is a tree structure. Depending on the operation situation of the system, data is typically updated with a portion thereof being deleted or new data added.

The management device 20 includes a file linking unit 22 having a plurality of management-information database structure definition files (MIB files) 21a, 21b, 21c, . . . describing the data structure of the management-information databases 12a, 12b, 12c, . . . respectively present in the network devices 10a, 10b, 10c, . . . , and integrating one group of MIB files (a plurality of MIB files defining one MIB tree) from among the MIB files 21a, 21b, 21c, . . . into a single MIB file 23, a network device management unit 24 to manage the network devices 10a, 10b, 10c, . . . using the MIB file linked by the file linking unit 22 (hereinafter "linked MIB file"), and a network communication unit 25 which physically connects the management device 20 to the network 1 to communicate with each of the network devices 10*a*, 10*b*, 10*c*, . . . The file linking process performed by the file linking unit 22 is discussed in detail below.

The definition of the MIB tree structure of each of the MIB databases 12*a*, 12*b*, 12*c*, . . . of the respective network devices 10*a*, 10*b*, 10*c*, . . . is dispersed across a plurality of MIB files.

For example, the definition of the MIB tree structure of the MIB database 12*a* in the network device 10*a* is dispersed across the three MIB files of 21*a*, 21*b*, and 21*c*, and the definition of the MIB tree structure of the MIB database 12*b* in the network device 10*b* is dispersed across the four MIB files of 21*d*, 21*e*, 21*f*, and 21*g* (these files not shown). In this way, the definition of the MIB tree structure is dispersed across a plurality of MIB files.

Figure 2:
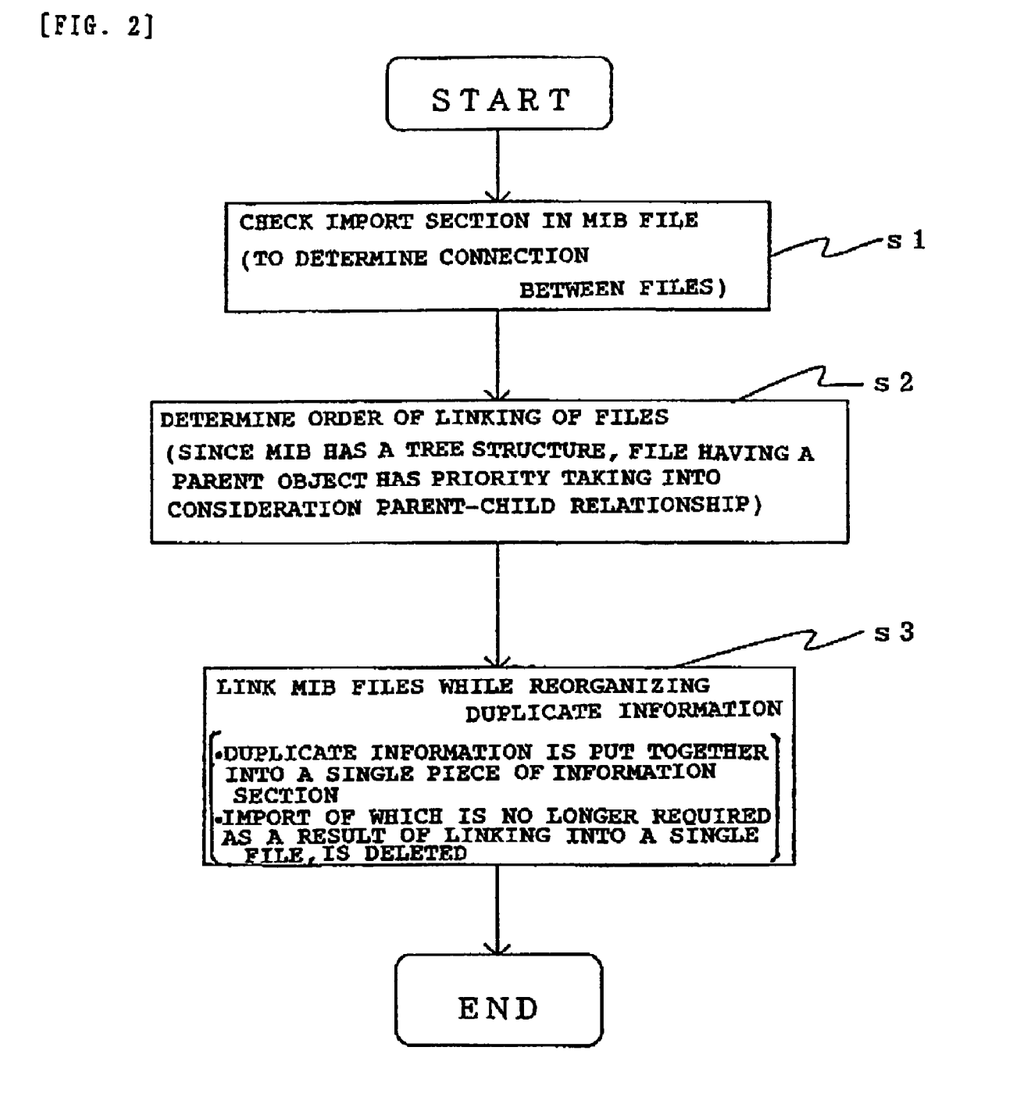
FIG. 2 is a flow diagram sequentially illustrating the linking process of management-information database structure definition files (MIB files) carried out by a file linking unit shown in FIG. 1.

The file linking process of the file linking unit 22 in this arrangement is discussed below. FIG. 2 diagrammatically illustrates the process steps of the file linking process. An import section present in the header portion of each of the plurality of MIB files is examined (step S1) to confirm the connection of the plurality of MIB files, and the order of linking of these MIB files is determined (step S2). Since the MIB data is arranged in a tree structure, an MIB file containing a parent object becomes a file higher in hierarchical level taking into consideration the parent-child relationship.

The present invention is discussed below with reference to this embodiment. In this embodiment, three MIB files of 21*a*, 21*b*, and 21*c* are linked.

Figure 3:
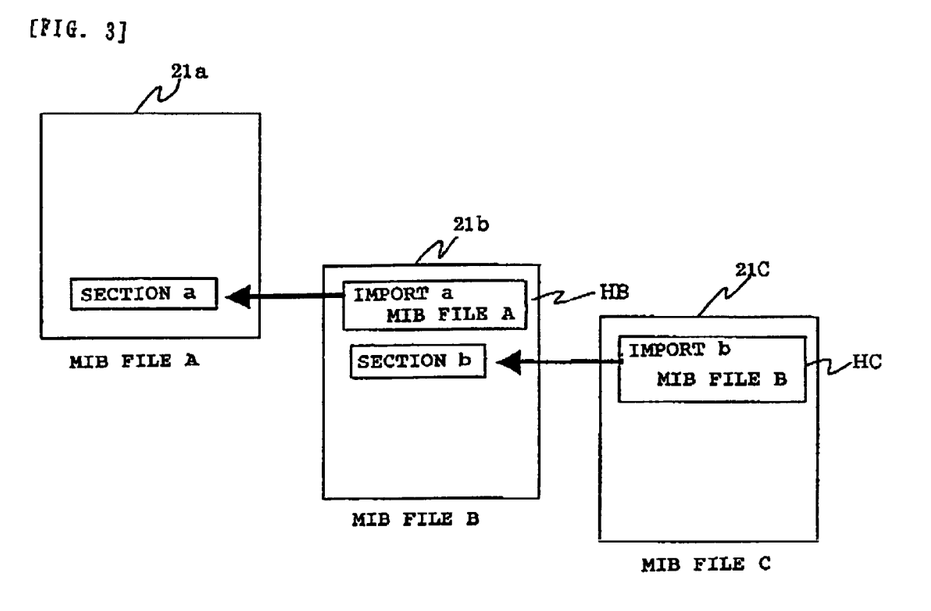
FIG. 3 is a schematic that illustrates the concept of the content of an MIB file, explaining the process of learning the connection of the plurality of MIB files.

FIG. 3 shows three MIB files 21*a*, 21*b*, and 21*c* (for convenience of explanation, MIB file 21*a* is referred to as MIB file A, MIB file 21*b* is referred to as MIB file B, and MIB file 21*c* is referred to as MIB file C in FIG. 3). Examining an import section present in the header portion HB of the MIB file B shows that the import section has a description of "a" and "MIB file A".

As already discussed, the format of the import section is defined in the ASN1 standard. For example, a description "enterprises FROM RFC1155-SMI", if present in the import section of the header portion in a given MIB file, means that this MIB file is continued from a section "enterprises" in a file called "RFC1155-SMI".

In the example illustrated in FIG. 3, the MIB file B is continued from a section "a" in the MIB file A. Since the MIB file C has a description of "a" and "MIB file A" in the import section in the header portion HC thereof, the MIB file C is continued from the section "b" in the MIB file B.

In the example illustrated in FIG. 3, the order of linking is MIB file A, MIB file B, and MIB file C.

If the order of linking of the MIB files 21*a*, 21*b*, and 21*c* is determined in this way, a linking operation is performed while reorganizing duplicate information (step S3). The reorganization process of information includes representing two pieces of duplicate information by one piece if any two of the three MIB files 21*a*, 21*b*, and 21*c* have respectively duplicate information, and deleting the import section which indicates the connection among the MIB files and which is necessary no longer when the three MIB files 21*a*, 21*b*, and 21*c* are integrated into a single MIB file.

Figure 4:
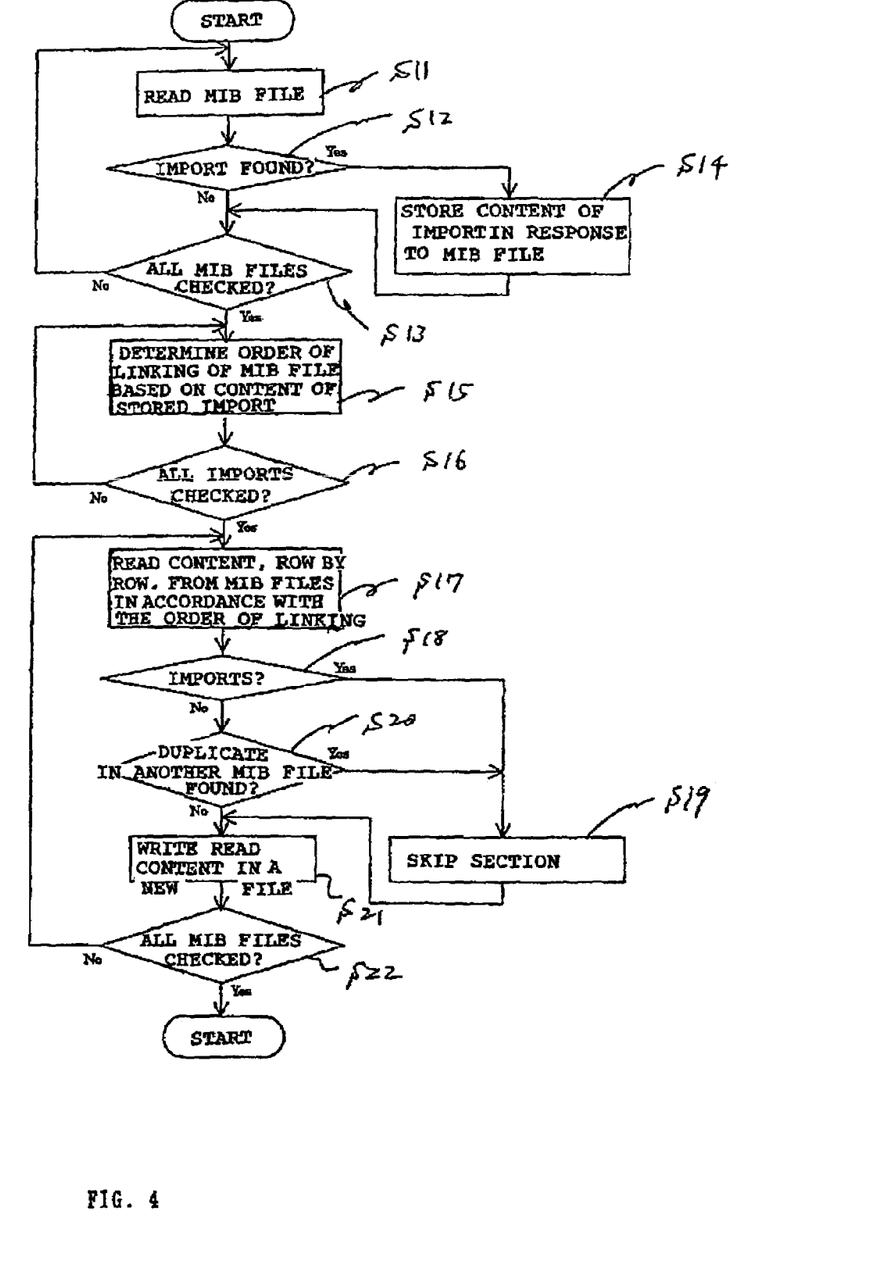
FIG. 4 is a flow diagram sequentially illustrating in detail the MIB file linking process illustrated in FIG. 2.

FIG. 4 is a flow diagram illustrating in detail the file linking process illustrated in FIG. 2. An MIB file is read (step S11). The management device 20 determines whether there is an import section describing a target section in the MIB file (step S12). If it is determined that there is no import section, the management device 20 determines whether all MIB files have been checked (step S13). If it is determined that any unchecked MIB file remains, the management device 20 reads that MIB file, and examines whether there is an import section describing a target section in the MIB file. This process is repeated (steps S11 through S13).

When it is determined that in step S12 that there is an import section describing a target section in the MIB file, the content of the import section associated with that MIB file is stored (step S14). The management device 20 then determines whether all MIB files have been checked (step S13). If it is determined that any unchecked MIB file remains, the management device 20 reads that MIB file, and examines whether there is an import section describing a target section in the MIB file. This process is repeated. If it is determined that all MIB files have been checked, the order of linking of the MIB files is determined from the stored content of the import sections (step S15).

The process (steps S15 and S16) is performed on all stored import sections. When all import sections have been checked, each MIB file is read one row at a time as a unit of processing in accordance with the order of linking determined in step S15 (step S17).

The management device 20 determines whether the read content is an import section (step S18). When it is determined that the read content is an import section, that section is skipped (step S19). When it is determined in step S18 that the read content is not an import section, the management device 20 determines whether the read content contains a section duplicated in another MIB file (step S20). If it is determined that there is a duplicate section, the read content is skipped (step S19).

When it is determined that the content read in step S17 is neither an import section nor the section duplicated in the other MIB file, the read content is then written on a new MIB file (linked MIB file) (step S21).

The management device 20 then determines whether all MIB files have been checked (step S22). If it is determined that all MIB files have not been checked, the algorithm loops to step S17 and steps S17 through S22 are repeated.

Through the above process, a single linked MIB file (linked MIB file) is produced. The linked MIB file includes a single piece of information by which duplicated pieces of the same information are represented. The reorganization of a plurality of MIB files into the single MIB file eliminates the need for the import section, and then the linked MIB file includes no import section.

In this way, the file linking unit 22 integrates the three MIB files 21*a*, 21*b*, and 21*b* illustrated in FIG. 1 into the single linked MIB file 23. Using the single linked MIB file 23, the network device management unit 24 manages the corresponding network device 10*a*.

When data is set in the network device 10*a*, the address and the data type of the destination to provide data setting are acquired from a plurality of MIB files (the three MIB files 21*a*, 21*b*, and 21*c* in this case). As already described, the three MIB files 21*a*, 21*b*, and 21*c* need to be tracked to acquire data in the related art. In accordance with the present invention, it suffices to use the single linked MIB file 23. Analysis is performed along a flow from up to down in the linked MIB file 23. In this way, the system efficiently reaches a target section.

When the specifications of the network device are modified, the device manufacturer produces a new MIB file reflecting that modification, and then distributes the new MIB file to each user. In accordance with the present invention, it suffices to distribute only the MIB file containing a correction or an addition to the user. Taking advantage of the linking function of the present invention, the user produces the linked MIB file with the new MIB file combined with the unmodified MIB file. The linked MIB file is thus a file reflecting the modification, and the object with the correction or the addition introduced thereinto thus becomes a new one.

The present invention is not limited to the above-referenced embodiment. A variety of changes is possible without departing from the scope of the present invention. For example, in the above embodiment, the three MIB files 21a, 21b, and 21c as the MIB files defining the MIB tree structure of the MIB database 12a in the network device 10a are linked. However, if the MIB tree structure of the MIB database 12b in the network device 10b is defined by the four MIB files of 21d, 21e, 21f, and 21g (these files not shown), the four MIB files of 21d, 21e, 21 f, and 21g (these files not shown) are linked in the same procedure as already described in the preceding embodiment. The same is true of another network device.

A process program describing the process for carrying out the present invention is produced. The process program is then stored in a storage medium, such as a floppy disk, an optical disk, or a hard disk. Such a storage medium which stores the process program falls within the scope of the present invention. From a network, such a process program may be downloaded.

In accordance with the present invention, the connection relationship of the MIB files are learned from the header portions of the plurality of management-information database structure definition files (MIB files), the order of linking is determined from the learned connection relationship, and the plurality of MIB files is linked while reorganizing the content of the MIB files. The plurality of MIB files is integrated into a single MIB file. When a target object is found, the target object is reached only by tracking the file content in the single MIB file. A file processing is thus efficiently performed.

The connection relationship of the plurality of MIB files is determined by examining the import section in the read header portion and by referring to the description in the import section. In other words, the import section present in the header portion of the MIB file contains a description indicating the connection between the MIB files. Referencing the import section shows which MIB file the MIB file of interest is continued from. The connection of the plurality of management-information database structure definition files is known by reading the content of the MIB files file by file, and examining the content of the import section thereof. In this way, the order of linking is determined.

When the order of linking of the plurality of MIB files is determined, the plurality of MIB files are integrated into a single MIB file in the order of linking while reorganizing the plurality of MIB files. The import section which becomes unnecessary any longer and the duplicated sections are removed. The resulting single linked MIB file becomes simple free from unnecessary and duplicated sections. When a target object is searched, the user reaches the target object by simply tracking the content of files from a single MIB file file by file, and thereby an efficient file process is performed. The use of such an MIB file allows the network device management to be efficiently performed.

The file linking function of the present invention not only enhances the efficiency of the acquisition process of the above object, but also allows the user to efficiently respond when the specifications of a network device are changed. When the specifications of a network device are changed, the device manufacturer thereof must produce a new MIB file responsive to the change, and must distribute the new MIB file to each user. In contrast, in accordance with the present invention, an MIB file describing a corrected portion or an added portion is simply distributed to each user. Using the file linking function of the present invention, the user links a new MIB file to an MIB file prior to the modification, thereby producing an MIB file reflecting the content of the modification. The user thus easily responds to the modification of the MIB file.

The invention claimed is:

1. A computer-implemented method for linking management-information database structure definition files in a network device management system, the network device management system including a network device having a management-information database and a management device having a network-device management device to manage the network device, the management device holding a plurality of management-information database structure definition files describing the structure of the management-information database, and the network-device management device managing the management-information database of the network device using the management-information database structure definition files, the management device performing a process to form a single management-information database structure definition file, the method comprising:

reading a header portion of each of the plurality of management-information database structure definition files;

learning a connection relationship of the plurality of management-information database structure definition files from the read content;

determining an order of linking from the learned connection relationship that includes, examining an import section of the read header portion, determining the connection between the management-information database structure definition files form the content of the import section, and determining the order of linking from the connection; and linking the plurality of management-information database structure definition files into the single management-information database structure definition file in the order of linking while reorganizing the content of the management-information database structure definition files, and linking the plurality of management-information database structure definition files while reorganizing the content of the management-information database structure definition files, including, on all management-information database structure definition files in the order of linking, reading the content of the management-information database structure definition file on a per unit of processing basis in accordance with the determined order of linking, deleting a section of the read content if the read content is a description of the import section, determining whether the read content is a duplicate of a description in another management-information database structure file if the read content is not the description of the import section, deleting a read character string if the read content is the duplicate, and writing the read content onto the linked management-information database structure definition file if the read content is neither the description of the import section nor the duplicate of the description in the other management-information database structure definition file.

2. A network device management system, comprising:
a network device having a management-information database;
a management device having a network-device management device to manage the network device, the management device holding a plurality of management-information database structure definition files describing the structure of the management-information database, and the network-device management device managing the management-information database of the network device using the management-information database structure definition files, and the management device including, a file linking device linking the plurality of management-information database structure definition files, and the file linking forming a single management-information database structure definition file that includes, reading a header portion of each of the plurality of management-information database structure definition files, learning the connection relationship of the plurality of management-information database structure definition files from the read content, determining an order of linking from the learned connection relationship that includes, examining an import section of the read header portion, determining the connection between the management-information database structure definition files that is determined from the content of the import section, and determining the order of linking from the connection; and linking the plurality of management-information database structure definition files into the single management-information database structure definition file in the order of linking while reorganizing the content of the management-information database structure definition files, and linking the plurality of management-information database structure definition files while reorganizing the content of the management-information database structure definition files, including, on all management-information database structure definition files in the order of linking, reading the content of the management-information database structure definition file on a per unit of processing basis in accordance with the determined order of linking, deleting a section of the read content if the read content is a description of the import section, determining whether the read content is a duplicate of a description in another management-information database structure file if the read content is not the description of the import section, deleting a read character string if the read content is the duplicate, and writing the read content onto the linked management-information database structure definition file if the read content is neither the description of the import section nor the duplicate of the description in the other management-information database structure definition file.

3. A processor readable medium including a process program for linking management-information database structure definition files in a network device management system, the network device management system including a network device having a management-information database and a management device having a network-device management device to manage the network device, the management device holding a plurality of management-information database structure definition files describing the structure of the management-information database, and the network-device management device managing the management-information database of the network device using the management-information database structure definition files, the process program forming a single management-information database structure definition file, the process program, which when executed by a processor causes the processor to perform a method comprising:

reading a header portion of each of the plurality of management-information database structure definition files;

learning the connection relationship of the plurality of management-information database structure definition files from the read content;

determining an order of linking from the learned connection relationship that includes, examining an import section of the read header portion, determining the connection between the management-information database structure definition files from the content of the import section, and determining the order of linking from the connection, and linking the plurality of management-information database structure definition files into the single management-information database structure definition file in the order of linking while reorganizing the content of the management-information database structure definition files; and linking the plurality of management-information database structure definition files while reorganizing the content of the management-information database structure definition files, including, on all management-information database structure definition files in the order of linking, reading the content of the management-information database structure definition file on a per unit of processing basis in accordance with the determined order of linking, deleting a section of the read content if the read content is a description of the import section, determining whether the read content is a duplicate of a description in another management-information database structure file if the read content is not the description of the import section, deleting a read character string if the read content is the duplicate, and writing the read content onto the linked management-information database structure definition file if the read content is neither the description of the import section nor the duplicate of the description in the other management-information database structure definition file.

* * * * *